May 5, 1953 T. E. BELSHAW ET AL 2,637,282
DOUGH FORMER
Filed Aug. 6, 1948 2 SHEETS—SHEET 2
FIG_3
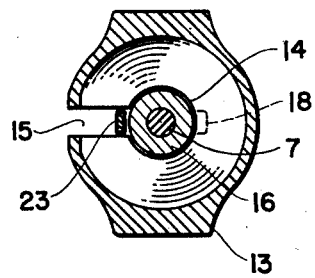
FIG_4
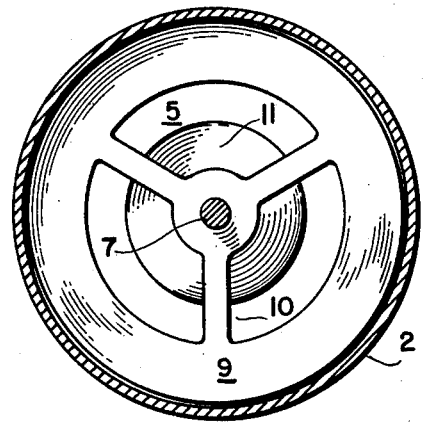
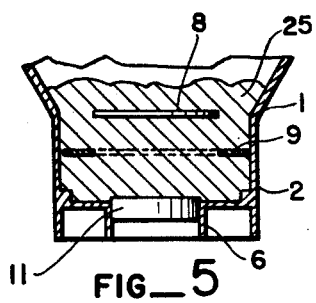
FIG_5
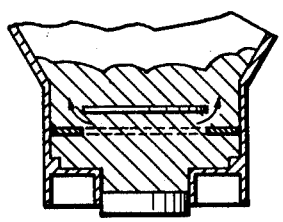
FIG_6
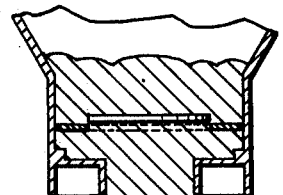
FIG_7
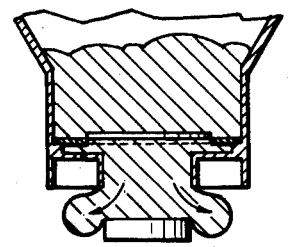
FIG_8
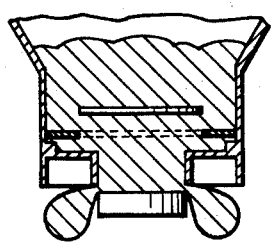
FIG_9
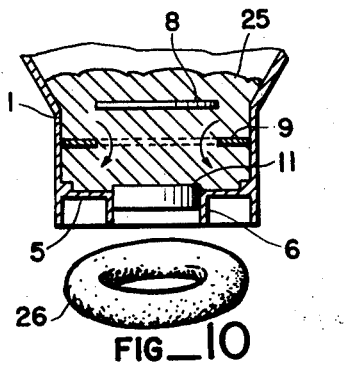
FIG_10
Inventors
THOMAS E. BELSHAW &
WALTER R. BELSHAW
By Paul Bliven
Attorney Patented May 5, 1953

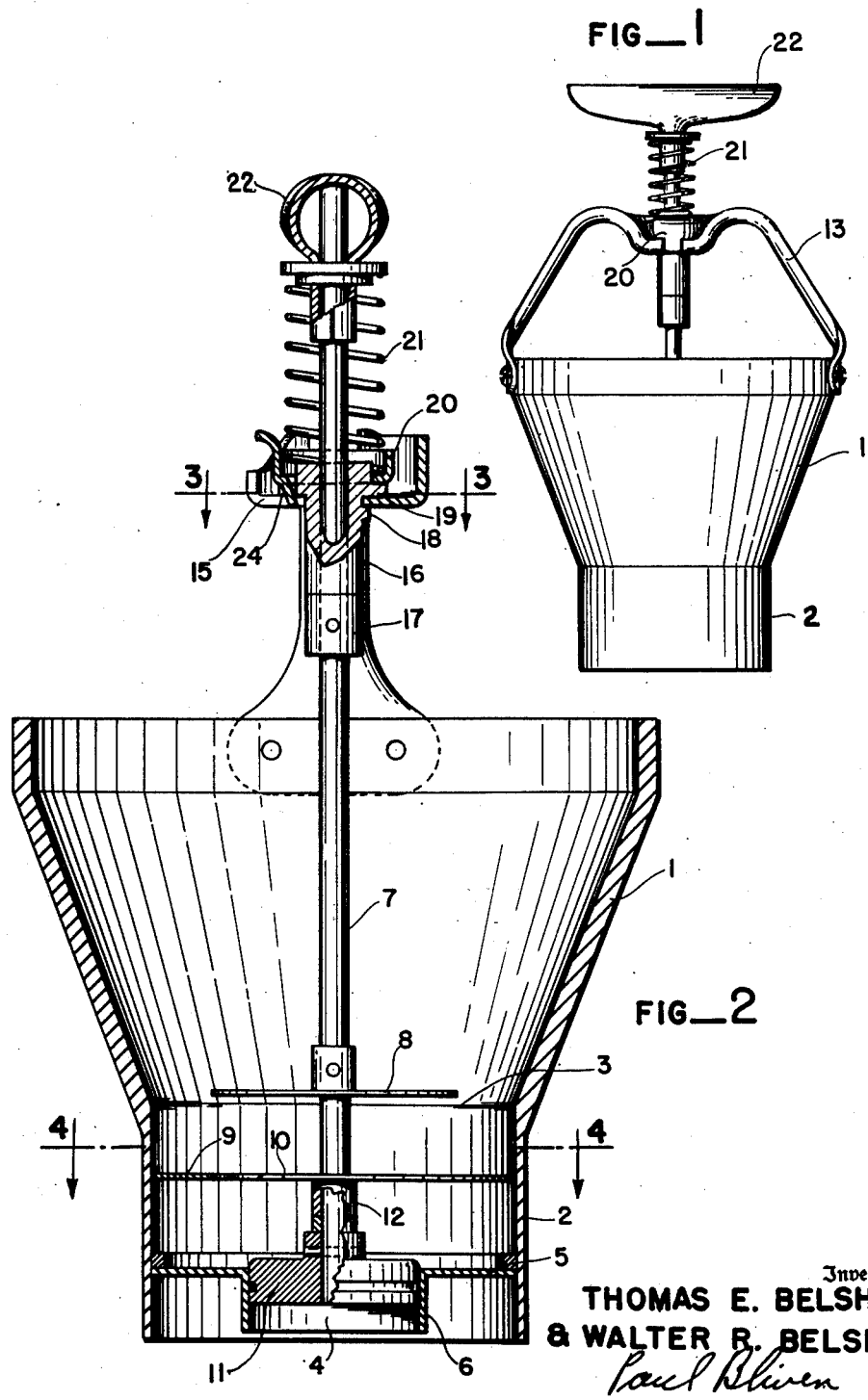

2,637,282

UNITED STATES PATENT OFFICE 2,637,282

DOUGH FORMER

Thomas E. Belshaw and Walter R. Belshaw,
Seattle, Wash.

Application August 6, 1948, Serial No. 42,788

1 Claim. (Cl. 107—14)

The present invention relates to a dough former and more particularly to a dough former adapted for the making of non-yeast doughnuts, and which former is simple in construction, light in weight, and small and compact enough to be sold for and used in the ordinary household.

At the present time, there is not in the art a dough former that has the mechanical advantages of the commercial doughnut machines, such as measuring of the dough for each doughnut and positive feed from a hopper.

Having in mind these lacks of the prior art, the objects of the present invention are to design a dough former that has few parts, is easy to clean, is compact, that may be built in small or large sizes, that may be easily made, and that when sold will be so inexpensive as to be within the reach of the ordinary household.

One form which our invention may assume is exemplified in the following description and illustrated in the accompanying drawings, in which:

Fig. 1 is an elevational view of the dough former.

Fig. 2 is a diametrical section on the axis of the former.

Fig. 3 is a section on the line 3—3 of Fig. 2.

Fig. 4 is a section on the line 4—4 of Fig. 2.

Figs. 5 to 10, inclusive, are schematic views showing various stages in the operation of the former.

Referring to Figs. 1 to 4, inclusive, of the drawings, the relationship of the parts of the former is as follows. The former is provided with a hopper 1 for the reception of a quantity of dough ready and prepared for forming into doughnuts. The hopper tapers downwardly to a valve chamber 2 through which the dough passes for measuring and forming as it is discharged. This chamber is formed with the inlet opening 3 which is the junction of the hopper and the chamber, and a discharge opening 4 which is formed in a transverse plate 5 by the cylinder 6 placed therethrough. Through the hopper and valve chamber is placed a rod 7. In the inlet of the chamber and secured to the rod 7 is an extrusion valve-seat 8 which is in the form of a solid disc. Loosely carried on the rod 7 and in the chamber is an extrusion valve 9 which is in the form of an apertured disc. The edges of the valve disc 9 fit easily against the inside wall of the valve chamber. When the valve 9 contacts the seat 8, apertures 10 in the valve are closed by the seat. Secured to the lower end of the rod 7 is a forming piston 11 that moves in and out of the cylinder 6. Carried above the piston 11 is a stop 12 movable with the rod 7, which stop in its upward movement, positions the valve 9 so that, as the valve-seat 8 moves downward and contacts the valve, the valve chamber will be cut off from the hopper and a quantity of dough will be measured for discharge. Accordingly, the valve and valve-seat may be considered as together forming a check valve.

Secured to the rim of the hopper 1 are the ends of a bail 13. The central portion of the bail is formed with a circular opening 14 which communicates with the edge of the bail by means of a slot 15. The slot 15 is of a width to easily accommodate the passage of the rod 7. The opening 14 is larger in diameter than the width of the slot 15, and accommodates a sleeve 16 that slides on the rod 7. Below the sleeve 16 is a stop 17, secured to the rod 7, that limits the downward movement of the sleeve 16. The body of the sleeve 16 carries a lug 18, and spaced above the lug a distance equal to the thickness of the bail around the opening 14 is a ring 19. Seated on the upper side of the ring 19 is a lock ring 20. The lock ring 20 is held against the sleeve ring 19 by means of a spring 21 that bears on one end against the lock ring and on the other end against the under side of a handle 22 secured to the upper end of the rod 7. The lock ring 20 has formed therewith a detent 23 that extends downwardly through and below a notch 24 formed in the sleeve ring 19. This notch 24 in the sleeve ring is offset around the sleeve from the lug 18 formed on the body of the sleeve. The lug 18 and the detent 23 are of a width to enter in the bail slot 15.

The rod 7 and the parts mounted thereon are placed in the hopper 1 and secured to the bail 13 by sliding the portion of the rod 7 below the sleeve stop 17 through the bail slot 15 into the bail opening 14. The rod 7 is then lowered so that the sleeve 16 enters the bail opening 14, the sleeve lug 18 passes downwardly through the bail slot 15, and the sleeve ring 19 seats upon the top surface of the bail. As the rod 7 is thus lowered, the piston 11 enters the sleeve 6. With the sleeve ring 19 seated on the bail, the handle 22 is turned until the detent 23 of the lock ring 20 enters the bail slot 15 under the urging of the spring 21. The rod assembly is then secured in place until the locking ring 20 is raised to withdraw the detent 23 from the bail slot 15 to allow rotation of the rod assembly to bring the sleeve lug 18 into registry with the bail slot 15.

With the dough former assembled and dough in the hopper, the rod 7 may be reciprocated by placing the palm of the hand on the top of the handle 22, and two fingers on each side of the sleeve 16 and in under the bail, and gripping the hand to compress the spring 21 to force the rod 7 down and the piston 11 down in the sleeve 6.

The operation of the device in forming a doughnut is shown schematically in Figs. 5 to 10, inclusive. Figure 5 shows the hopper 1 and the valve chamber 2 full of dough 25, and the valve seat 8, valve 9, and piston 11 in their upper, or raised, position. The piston 11 and valve seat 8 are held in position by being secured to the rod 7, and the valve 9, loosely sliding on the rod 7, is held in this upper position by the stop 12 located above the piston 11. As the rod 7 carries the valve seat 8 and the piston 11 downward, as in Fig. 6, the valve 9 will slide on the rod 7, dough will be pulled into the piston cylinder 6, and the valve 9 will engage the seat 8 to cut off the dough in the valve chamber 2 from the dough in the hopper 1, as in Fig. 7. At the point of closure of the valve 9 with the valve seat 8, the piston 11 will leave the cylinder 6 and further downward movement of the piston, valve seat and valve will extrude dough by the piston 11, as in Fig. 8. The downward movement of the rod 7 with its associated parts is limited by the compression of the spring 21 beneath the handle 22.

As the rod then moves upward, the piston 11 enters the cylinder 6, the doughnut 26 is cut off, as in Fig. 9, and the valve seat 8 leaves the valve 9. Further upward movement brings the stop 12 against the under side of the valve 9 and raises the valve. This upward movement of the valve draws dough from the hopper into the valve chamber. The upward movement of the rod 7 and its associated parts is limited by the stop 17 coming against the sleeve 16 which is secured in the bail 13 of the hopper 1. The device in this position, Fig. 10, is then ready for another cycle, as in Fig. 1.

Having thus described our invention, we claim:

In a dough former, a hopper providing a valve chamber having an inlet and outlet, a rod extending through the chamber, a piston mounted on the outlet end of the rod for opening and closing the outlet, a stop on the rod in the chamber and spaced from the piston, a check valve in the chamber including as complementing parts a valve and valve seat, one secured to the rod further from the piston than the stop and the other floating between the stop and the said secured part, and means for imparting reciprocating movement of the rod relative to the chamber walls whereby the check valve automatically closes during each outlet opening stroke of the piston to isolate a charge of dough and forcibly dispense the same in a ring-like form from the chamber and between the outlet and the piston and whereby the valve automatically opens during each outlet closing stroke of the piston to replenish the foregoing dispensed charge of dough from the hopper.

THOMAS E. BELSHAW.
WALTER R. BELSHAW.

References Cited in the file of this patent

UNITED STATES PATENTS

| Number | Name | Date |
| --- | --- | --- |
| 534,106 | Hueg | Feb. 12, 1895 |
| 1,571,268 | Hein | Feb. 2, 1926 |
| 1,948,022 | Carpenter | Feb. 20, 1934 |
| 2,170,718 | Humphries | Aug. 22, 1939 |
| 2,210,278 | Carpenter | Aug. 6, 1940 |
| 2,447,182 | Hutchinson | Aug. 17, 1948 |